Dec. 27, 1966    O. E. ROSAEN ET AL    3,294,238
OIL FILTERS
Original Filed May 2, 1960    2 Sheets-Sheet 1

INVENTORS
OSCAR E. ROSAEN
NILS O. ROSAEN
BY
Hutchinson & Milans
ATTORNEYS

Dec. 27, 1966  O. E. ROSAEN ETAL  3,294,238
OIL FILTERS
Original Filed May 2, 1960  2 Sheets-Sheet 2

INVENTORS
OSCAR E. ROSAEN
BY  NILS O. ROSAEN

*Hutchinson & Milans*
ATTORNEYS 3,294,238
OIL FILTERS
Oscar E. Rosaen, Grosse Point, and Nils S. Rosaen, Bloomfield Hills, Mich., assignors to The Rosaen Filter Company, Hazel Park, Mich., a corporation of Michigan
Continuation of application Ser. No. 26,046, May 2, 1960. This application Dec. 11, 1963, Ser. No. 331,640
3 Claims. (Cl. 210—90)

This application is a continuation of our copending application Serial No. 26,046, filed May 2, 1960, and now abandoned.

The present invention relates to fluid filters and in particular to improvements in oil filters of the type used for filtering circulating oil as commonly used in many hydraulically actuated industrial operations.

Such operations generally employ a fluid pump drawing oil from a source of supply and delivering the same under pressure throughout the fluid system for the operation of suitable component parts thereof, after which the fluid is returned to the source of supply to be recirculated by the pump. Filters are generally installed in such systems between the source of supply and the intake to the pump so that dirt, grit and the like foreign matter are removed from the oil to prevent such matter from fouling the pump and other parts of the system.

In such systems, when the filter begins to become clogged with foreign matter screened from the fluid, such clogging, with consequent reduced oil flow, is difficult to detect before the system to which the oil is supplied becomes starved or receives less oil than is desirable for proper operation and protection of the system.

Among the objects of the present invention is to provide a filter which, when it becomes clogged from continued use, will by-pass oil to prevent interference with the operation of the system due to lack of oil.

Another object of the invention is to provide a filter device which will indicate and signal the clogging of the filter element before it reaches an undesirable extent.

Another object is to provide a filter which will bypass the oil when the clogging becomes excessive and when and if the signal is not observed or is completely ignored, to thereby protect the system and prevent serious damage to the pumps and other components of the system.

Another object of the invention is to provide a filter device for hydraulic systems with by-pass means for by-passing the fluid around the filtering element when the element becomes excessively clogged with filtered dirt, and in which device provision is made for clearly indicating to an attendant the precise condition of the filter element at any time and which indicating means will clearly signal the need for changing the filter element before actual by-passing of the fluid occurs.

Another object of the invention is the provision of an accurate and simplified indicating means for signalling the condition of the filter at all times.

A further and important object of the invention is to provide a filter which, when by-passing, causes the oil flow to traverse a fresh screen so that no unfiltered oil will pass into the system.

Other objects and advantages will readily occur to those skilled in the art upon reference to the following description and the accompanying drawings in which FIG. 1 is a longitudinal sectional view taken on line 1—1 of FIG. 2 showing the preferred form of the present invention;

The present oil filter is similar in certain basic aspects to the oil filter shown and claimed in our copending prior application Serial No. 649,059, filed March 28, 1957, now Patent No. 3,053,389, issued September 11, 1962, but differs from the structure there shown in the means for indicating movement of the filter element in the housing, as well as in the novel provision of a secondary screen associated in the filter element assembly.

Filters of the present type are commonly referred to as "suction filters," since they are installed on the suction or intake side of the pump, with the outlet of the filter unit connected to the intake of the pump and the inlet of the filter unit connected to a conduit leading from the oil reservoir or supply of the hydraulic system. When the pump is in operation, fluid is drawn from the supply through the filter unit to the pump which in turn delivers the fluid under pressure to the system for actuation of the components thereof, after which the fluid is returned to the reservoir or supply for recirculation. In the accompanying drawings the system, pump and oil supply are not shown, since it is believed such a showing is not necessary for an adequate understanding of the invention to those skilled in the art.

Figure 1:
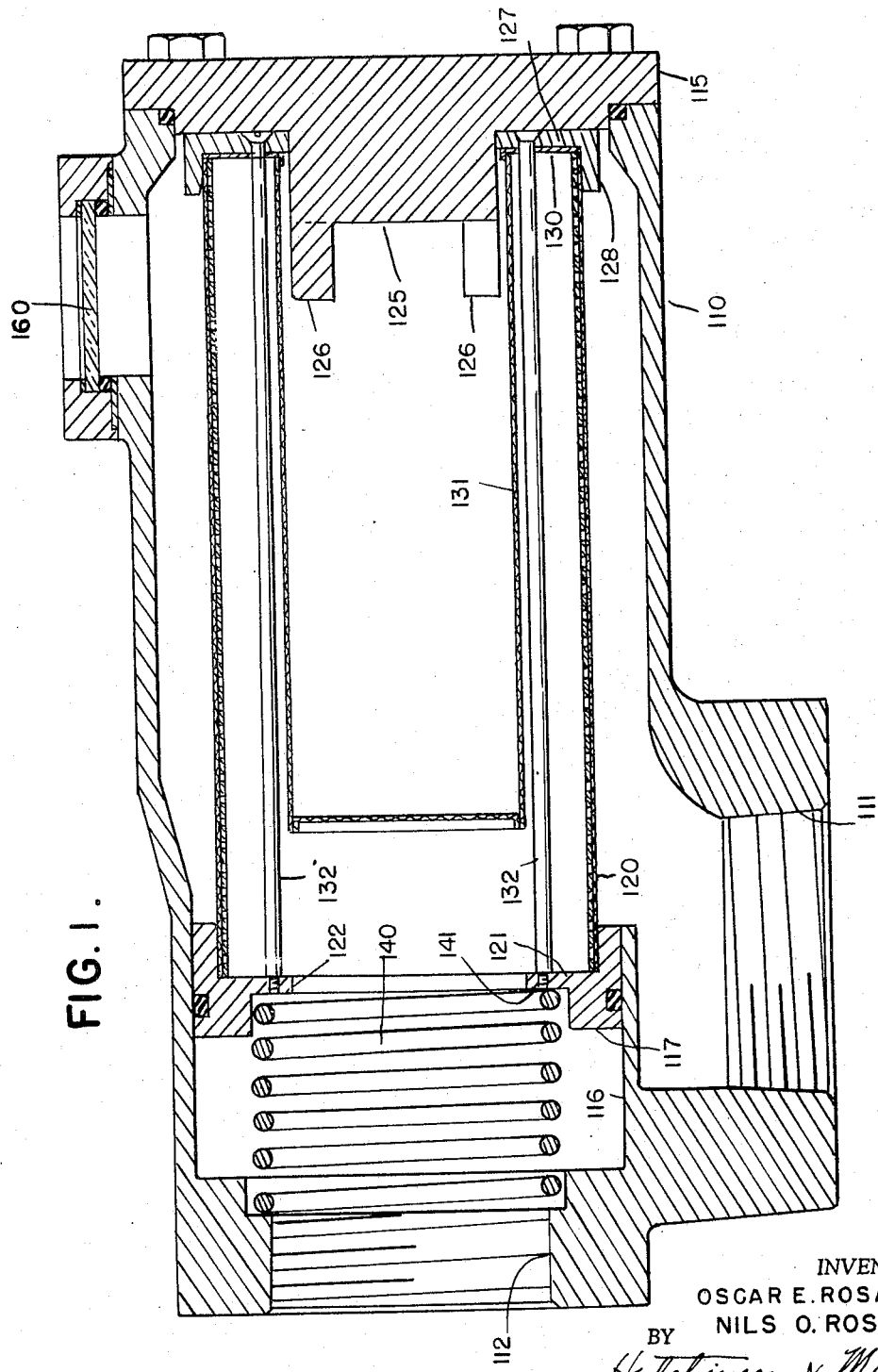

Referring to FIG. 1 of the drawings, it will be seen that the present oil filter comprises a generally cylindrical housing 110 provided near one end with a lateral boss through which is arranged the inlet 111. At the same end is provided an axially arranged outlet 112. The other end of the housing 110 is closed by a suitable cover or closure plate 115 removably secured to the housing by suitable bolts as shown, said closure plate providing when removed from said housing access to the interior of the housing for the removal and insertion of the filter element.

Inside of the housing and coaxial with the outlet 112 the housing wall is finished to provide a cylinder 116 adapted to receive a cooperating piston 117 in the form of an annulus. Carried by the piston 117 and coaxial therewith is a cylindrical screen or filtering element 120, seated upon a suitable shoulder 121 surrounding the opening 122 in the piston annulus.

At the other end of the housing, the closure plate 115 is provided on its inner face with a cylindrical boss 125 terminating in spaced tongues 126. The boss 125 is coaxial with cylinder 116 and of smaller diameter, and serves as a guide for a ring 127, provided on its outer periphery with a deep flange 128, within which is seated the end of screen 120. Ring 127 is formed to have an inner diameter such as to closely fit the boss 125 but slide freely thereon.

Also shown in connection with this invention is the employment of a second concentrically arranged screen or filtering element 131 which is adapted to filter the fluid only when the fluid is being by-passed of the main screen or filter element 120, as will hereinafter be explained. Mounted on ring 127, and abutting the end of screen 120, is an annular plate 130 which has fixed to its inner edge portion the second screen 131 closed at its free end, the ring 127 with screens 120 and 131 being fixed together as a unit by means of suitable screws or bolts 132 passing through ring 127 and threaded into piston 117 as shown.

The assembly of piston, screens and ring is maintained in the position shown in FIG. 1, i.e. with the ring 127 at the base of the boss 125 against the closure 115, by means of a selected coil spring 140 seated against a shoulder in the end of cylinder 116 and on a suitable shoulder 141 formed in the piston.

Figure 2:
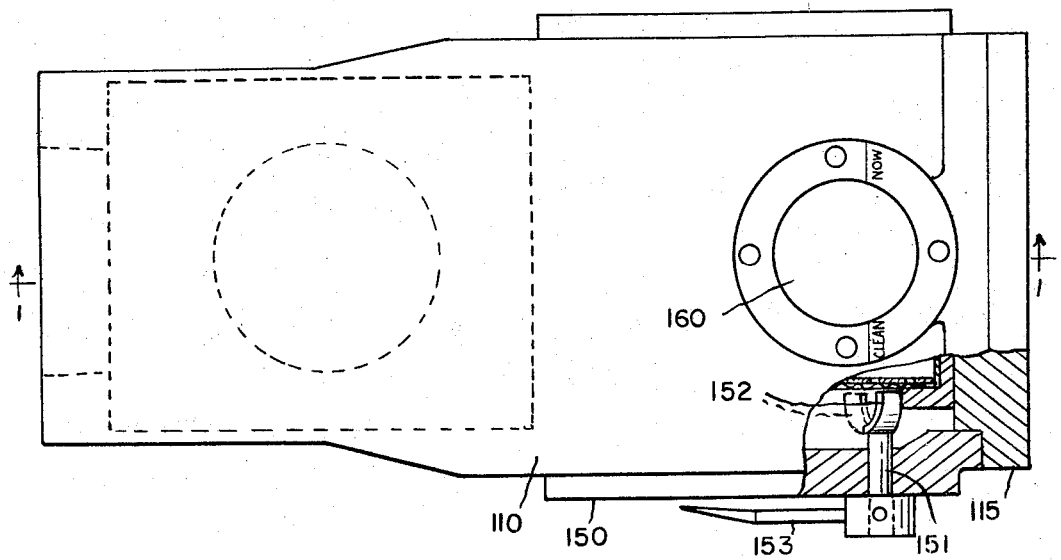
FIG. 2 is a top plan view of the oil filter shown in FIG. 1, with parts broken away and shown in section to show the mechanism for actuating the indicating arm in relation to the filter element.
Figure 3:
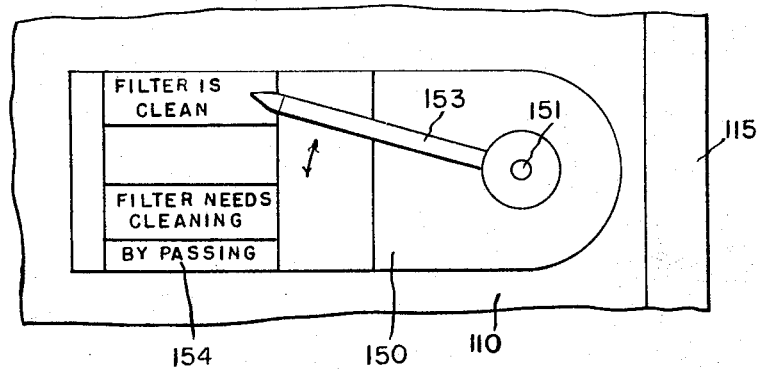
FIG. 3 is a fragmentary side elevation showing the indicating means and the legend plate.
Figure 4:
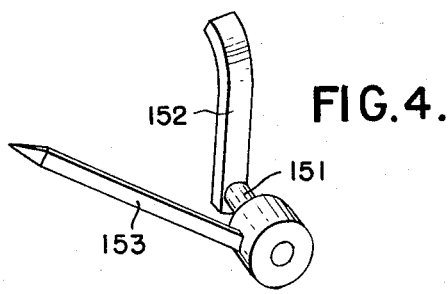
FIG. 4 is a perspective view of the indicating arm mechanism completely removed from the filter housing.

On one side of the housing is provided a flat, preferably rectangular, boss 150, see FIGS. 2 and 3, having near one end an opening through the boss and housing wall and acting as a bearing for a short shaft 151 carrying at its inner end a crank arm 152 and on its outer end an indicator hand 153. The free end of the crank arm is positioned with its outer end arranged to bear against the flange 128 of ring 127 to be actuated thereby on axial movement to the left of the filter element assembly or cartridge, which will result in partial rotation of the hand 153 over suitable indicia 154, thus indicating to the attendant from the hand position the condition of the filter screen or element.

As shown in FIG. 3, the indicia 154 preferably contains such legends as "FILTER IS CLEAN," "FILTER NEEDS CLEANING" and "BY-PASSING." The indicator arm 153 is adjusted on the shaft 151 with reference to the crank arm 152, so that arm 153 points to the "FILTER IS CLEAN" position when the outer end of the crank arm is bearing against the flange 128 with the ring 127 being firmly held against the closure plate 115 by coil spring 140.

The compression spring 140 is selected of a strength sufficient to retain the filter element 120 together with its associated end caps, piston 117 and ring 127, when the screen is clean, in the extreme right hand position of the casing as viewed in FIG. 1. The spring selection will, of course, be based upon the rating of the pump in the particular system in which the filter unit is being installed, consideration being given to the desired permissible pressure drop between the inlet 111 and the outlet 112 of the unit when the pump and system are in operation.

In the operation of the device, oil is drawn in through the inlet 111 through suction applied by the pump in the line connected to the outlet 112 filling the outer chamber surrounding the screen 120 and flows normally through the screen 120 to the interior thereof where it passes through the opening 122 and out to the intake of the pump. It will be appreciated that in addition to filling the chamber outside of said screen 120, the oil will normally enter between the abutting faces of the ring 127 and the closure plate 115, but will not pass between the closely fitting surfaces defining the ring opening and boss 125. However, as heretofore mentioned, the selected spring 140 will prevent the cartridge from moving to the left away from the face of the closure plate under normal operating conditions.

As the screen 120 begins to become clogged and the pressure difference between inlet and outlet rises above the selected or predetermined permissible pressure drop, the piston, screen and ring assembly begins to move against the resistance of spring 140 until the ring 127 eventually clears the boss 125, allowing at that time oil to by-pass screen 120 and flow directly to the interior between the boss extensions 126. However, the fluid by-passing the filtering screen 120 will also be screened or filtered since it must pass through the secondary screen 131 before reaching outlet 112 on its way to the pump intake. Under these circumstances it will be seen that no dirty oil can pass out of the outlet 112 as it must pass through the fresh secondary screen 131. Screen 131 may be of the same mesh as screen 120 but is preferably formed of a somewhat coarser mesh material.

It will thus be apparent that movement of the filter cartridge assembly to the left as viewed in FIG. 1 due to an increase in pressure differential does not uncover any additional areas to pressure, since the piston 117 is at all times piloted within the cylinder 116 and the opening in ring 127 is at all times piloted on the guide boss 125. Operating pressure differential occurs substantially only between the inner and the outer faces of the ring 127. Hence the filter element acts as a true piston, as opposed to conventional poppet valve devices, and being urged to the right by the spring 140, the filter assembly will, after it starts to move tend to assume a position where spring pressure is balanced by fluid pressure forces. The greater the fluid pressure differential caused by clogging of the screen, the greater the compression of the spring 140. The degree of movement of the filter toward the by-pass position is thus a linear function of pressure drop across the filter screen.

As the filter element gradually moves toward the outlet end of the casing in response to the differential pressures involved as progressive clogging of the filter continues, flange 128 of the ring or cap 127 will move the crank arm 152, as indicated by the dotted line position shown in FIG. 2, which will in turn rotate the indicator arm 153 from the "FILTER IS CLEAN" position downwardly, as viewed in FIG. 3, to indicate the filter needs to be cleaned or changed for a new filter and eventually to the "BY-PASSING" position when by-passing is in progress. It will be noted that there is a relatively long or extended movement of the ring 127 between the time it begins to leave the adjacent wall of closure plate 115 and the time it exposes the openings between the tongues 126 on boss 125 to the incoming oil or fluid. There is consequently a continued and adequate signal being given the attendant throughout this entire range of movement of the filter element so that the precise condition of the filter screen is known to the attendant at any moment of operation and long prior to actual by-passing of the screen 120.

Whenever a clean filter element is inserted into the filter housing and prior to resumption of operation of the system, the operator should move the indicator arm 153 to the "FILTER IS CLEAN" position on the legend plate which will bring the crank arm against the flange of ring or cap 127. As the clogging of the filter progresses, the hand 153 will be moved as described above. If the filter screen has become progressively clogged to the point where the cartridge has moved the hand to the "FILTER NEEDS CLEANING" position and this forewarning has gone unheeded by the operator prior to shutting down the system and the pump, it will be noted that the arm will remain in that indicating position even though the system is idle, thus forewarning the operator prior to resumption of operation of the system that the filter is dirty and should be changed before operation begins.

In addition to the indication given by the arm 153, there is likewise a secondary indicating means, namely, a sight glass 160 located in the wall of the housing so that an observer may note the position of the ring 127 with relation to the "clean now" marking, as shown in FIG. 2.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

We claim:

1. An oil filter comprising a cylindrical housing, a laterally arranged oil inlet thereto, an axially arranged oil outlet therefrom, the housing wall surrounding said outlet being finished to provide a cylinder, an annular piston slidable in said cylinder and carrying one end of a first cylindrical screen surrounding the opening in the annular piston and spaced from the wall of the housing, a ring abutting the other end of said screen and fixed thereto, a second cylindrical screen fixed at one end thereof to said ring and closed at the opposite end and concentrically disposed within and spaced from the first screen to form a two screen cartridge unit, a closure plate for said housing at the end opposite said outlet, said plate having a boss coaxial with said ring and slidably fitting therein, spring means biased between said piston and said housing at the end of said housing opposite said ring for maintaining the piston, screen and ring assembly against said closure plate and with said boss closing the ring opening, said spring means allowing the said assembly to move axially away from said plate and uncover the ring opening to permit incoming oil to enter said opening and by-pass said first mentioned screen when the pressure differential between the space inside and outside said screens increases beyond a predetermined amount due to clogging of the first screen, and means engaging the ring and movable thereby upon axial movement of said assembly to indicate the extent of said movement.

2. The filter as defined in claim 1 and in which said last mentioned means comprises an indicating arm rotatably mounted on the side of said housing and carried by a shaft extending through the housing transversely to the direction of movement of said assembly, a crank arm carried by the inner end of said shaft with the free end of said crank arm curved and positioned adjacent to and engageable by said ring for moving said indicating arm on movement of said assembly and suitable indicia carried by said housing and correlated with respect to said indicator arm to indicate the extent of the axial movement of said assembly to thereby indicate the condition of the first screen and when by-passing of the first screen is produced.

3. A fluid filter comprising a housing, an inlet thereto, an outlet therefrom disposed at one end of said housing, the housing wall surrounding said outlet being finished to provide a guide surface, a piston having a central opening and slidable along said guide surface, said piston carrying one end of a first hollow screen surrounding the opening in the piston and spaced from the wall of the housing, a ring abutting the other end of said screen and fixed thereto, a second hollow screen fixed at one end thereof to said ring and closed at the opposite end and disposed within and spaced from the first screen to form a two screen cartridge unit, a closure plate for said housing at the end opposite said outlet, said plate having a boss coaxial with said ring and slidably fitting therein, spring means biased between said piston and said housing at the end of said housing opposite said ring for maintaining the piston, screen and ring assembly against said closure plate and with said boss closing the ring opening, said spring means allowing the said assembly to move axially away from said plate and uncover the ring opening to permit incoming fluid to enter said opening and by-pass said first mentioned screen when the pressure differential between the space inside and outside said screens increases beyond a predetermined amount due to clogging of the first screen, and means engaging the ring and movable thereby upon axial movement of said assembly to indicate the extent of said movement.

References Cited by the Examiner
UNITED STATES PATENTS

| | | | |
|---|---|---|---|
| 2,998,138 | 8/1961 | Mould et al. | 210—132 X |
| 3,000,505 | 9/1961 | Scavuzzo | 210—132 |
| 3,076,335 | 2/1963 | Rosaen | 210—90 X |
| 3,157,596 | 11/1964 | Rosaen | 210—90 |

REUBEN FRIEDMAN, *Primary Examiner.*

SAMIH N. ZAHARNA, *Assistant Examiner.*